Sept. 10, 1929.  H. E. BUCKLEN ET AL  1,728,037
ELECTRIC RELAY
Filed June 10, 1927  2 Sheets-Sheet 1

Inventors
Herbert E. Bucklen
Hartie O. Putt
By Mason Fenwick Lawrence Attys

Sept. 10, 1929.  H. E. BUCKLEN ET AL  1,728,037
ELECTRIC RELAY
Filed June 10, 1927   2 Sheets-Sheet 2
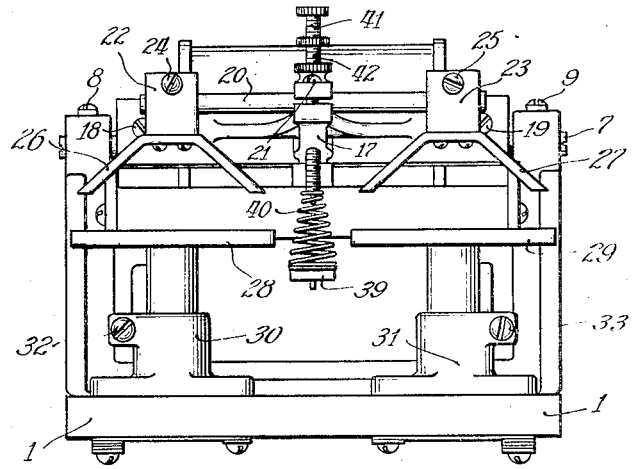

Patented Sept. 10, 1929.

1,728,037

UNITED STATES PATENT OFFICE.

HERBERT E. BUCKLEN AND HARLIE O. PUTT, OF ELKHART, INDIANA, ASSIGNORS TO HERBERT E. BUCKLEN, OF ELKHART, INDIANA.

ELECTRIC RELAY.

Application filed June 10, 1927. Serial No. 197,866.

Our invention relates in general to electric relays, and more particularly to protective relays for use in wind driven battery charging systems.

In wind driven battery charging systems it is essential to employ a very sensitive reverse current cut-in relay in order that the maximum amount of power may be obtained from relatively feeble winds and also in order to prevent the battery discharging through the generator. Because of its very sensitivity, the reverse current cut-out relay is easily susceptible to any jar or vibration. It very often occurs that this relay is so vibrated as to bring about the closure of its contacts when the generator is running at low speed and the voltage of the current generated thereby is less than the battery voltage. Under these conditions, the battery is discharged through the low resistance generator winding, and the reverse current cut-out relay is maintained energized by the current flow. As a result of this large reverse current flow, the generator winding may be burned out, the battery ruined, and the reverse current cut-out relay destroyed. The extreme sensitivity of the reverse current cut-out relay is necessary because of the fact that in generating plants employing wind for motor power the lowest possible cut-in characteristic must be secured in this relay. This means that the relay must function to close the charging circuit when the voltage of the generator is very slightly above the battery voltage. This, therefore, necessitates a minimum gap between the contacts and very little tension in the restoring space.

Another condition that must be met in battery charging systems of this character, is one in which a fuse, that is connected in series with the shunt field winding of the generator, blows while the generator is charging at a relatively high rate. There is sufficient lag in the operation of the reverse current cut-out under these conditions to permit the battery to discharge through the generator armature with the same results as before mentioned. This same trouble arises if the generator brush by which current is supplied to the shunt field winding should fail to contact, or if the conductor by which the shunt field is connected to its fuse at the control panel, should become open by being blown down by high winds while charging. This discharge through the generator can, of course, be prevented if there is anyone around the equipment to notice it, by opening the main switch on the control board.

Another possibility of trouble arises should the main generator circuit be opened for any reason, the generator voltage would build up to dangerous proportions through the shunt field and the field winding would very probably be burned out. Again, if there is no speed control of the generator under the above conditions, the propeller or impeller would race at a speed many times faster than when under load, and an excessive voltage would be generated and impressed on the field winding, causing it to be burned out.

In view of the foregoing it will be seen that it is imperative to provide some kind of a protective device or system to take care of the above conditions so that no harm will arise should they occur. Also, in view of the fact that these wind driven battery charging systems are employed for farm lighting or for isolated places in which wind is the only power available and in which a relatively cheap battery charging system must be obtained, it is essential that the cost of this protective device or system be comparatively small.

We have devised a protective system in which all of the foregoing troubles are obviated by providing a special protective relay of novel design. We find that, by constructing a relay having a lower voltage cut-in characteristic than the reverse current cut-out relay and placing it in the circuit at a point where it may function to connect the positive generator conductor to the positive battery conductor, all the above troubles may be eliminated. Since the only function of this relay is to connect the battery and generator conductors together at a voltage slightly under the cut-in voltage, it is possible to make the relay much more rugged than the reverse current cut-out relay. The relay cannot be operated by vibration to an extent sufficient to close its contacts in view of its rugged construction.

In constructing the relay of our invention, we have provided many structural improvements and advantages which assist in the production of a simple form of sensitive and reliable instrument of this character, all of which will be more apparent from the following detailed description of a specific embodiment of our invention, together with the system in which it is used.

Referring now to the drawings, in which:—

Fig. 3 is an end elevation taken from the bottom of Fig. 1; and

Fig. 4 is a circuit diagram showing the manner of connecting my improved relay in a wind driven battery charging system to furnish proper protection.

Figure 1:
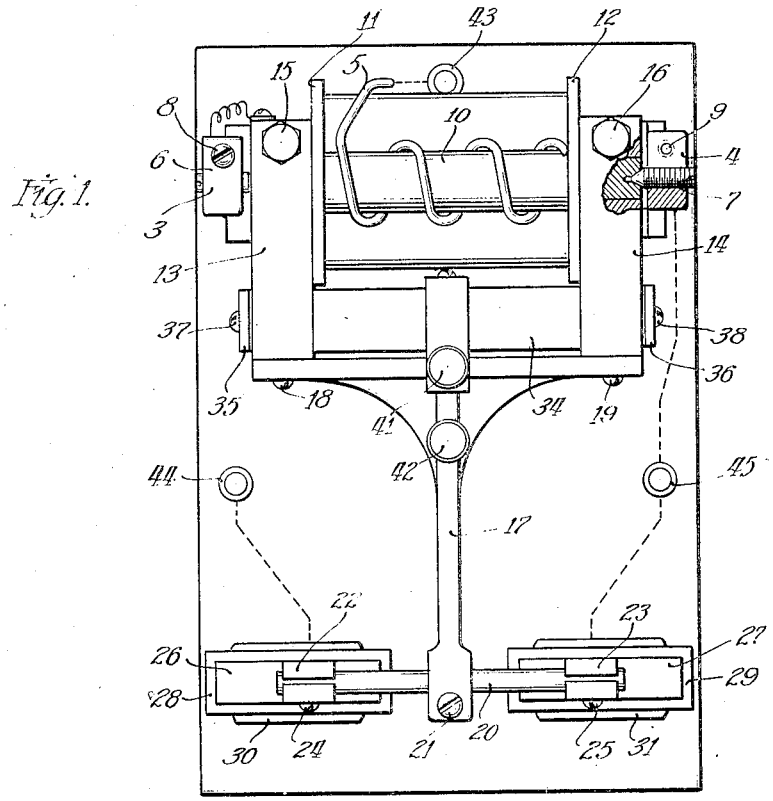
Fig. 1 is a top plan view of our improved relay.
Figure 2:
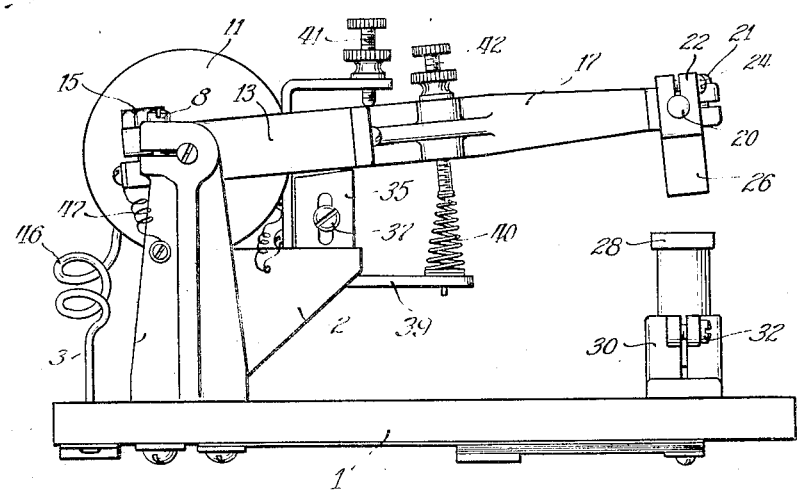
Fig. 2 is a side elevation of the same.

Referring now more particularly to Figs. 1, 2 and 3, in which like reference characters indicate similar parts in the various figures, our improved relay consists of a suitable base 1 upon which is mounted a bracket 2 carrying extending posts 3 and 4. The bracket 2 is cast from brass or some other suitable non-magnetic material. An electro-magnet 5 is pivotally mounted upon the upper end of the posts 3 and 4 by the pivot bearings 6 and 7 which pass into bearing surfaces in the ends of the magnet core. The pivot screws 6 and 7 after being adjusted to properly position the electro-magnet, are clamped into position by the clamping screws 8 and 9. The core 10 is provided with supporting shoulders 11 and 12 at either end and serves to space two pole pieces 13 and 14 which are clamped on the core by the clamping screws 15 and 16. A T-shaped casting 17 of brass or other suitable non-magnetic material, is mounted upon the pole pieces 13 and 14 by means of the screws 18 and 19. The other end of the T-shaped bar 17 is drilled and slotted to receive a round brass rod 20, which is adjustably clamped to the bar 17 by means of the clamping screw 21. Two small brass blocks 22 and 23 are drilled and slotted to pass over either end of the brass rod 20. The brass blocks 22 and 23 are clamped to the rod 20 by means of the clamping screws 24 and 25. Two contact members 26 and 27 of laminated phosphor bronze are suitably attached to the brass blocks 22 and 23. Two contact members 28 and 29, of brass or any other suitable material, are adjustably mounted in suitable clamping sockets 30 and 31, carried by the base 1. The contact members 28 and 29 are circular in shape and may be raised or lowered or rotated by loosening the clamping screws 32 and 33, respectively. An armature bar 34 of suitable magnetic material is mounted upon the shelf-like bracket 2 in any suitable manner. The armature bar 34 extends a short distance—1/32 of an inch in our practice—beyond the pole pieces on either side. Two slotted iron lips 35 and 36 are adjustably attached to the armature bar by means of the clamping screws 37 and 38. These lips 35 and 36 may be moved with respect to the pole pieces 13 and 14, and are for the purpose of reducing the reluctance of the air gap between the armature bar and the pole pieces. This construction permits the maximum opening to be obtained between the contact making members 26 and 27 and the contact members 28 and 29. In addition, by adjusting these lips 35 and 36 with respect to the pole pieces 13 and 14, a variation in the operation of the relay may be obtained with respect to the voltage necessary to operate it. A U-shaped brass bar 39 is mounted upon the armature bar 35 in any desired manner. The lower extremity of this U-shaped bar is somewhat longer than its upper extremity. The lower extremity of this U-shaped bar carries, at its outer end, a tension spring 40, while the upper extremity is threaded to receive an adjusting screw 41. The adjusting screw 41 is provided for the purpose of adjusting the contact making member carrying bar 17. A stop screw 42 is threaded through the bar 17 and attached to the spring 40. By means of the screw 42 the tension of the spring 40 may be adjusted. Electrical connections are made to the relay through the mounting terminals 43, 44 and 45, which, in our practice, are flanged brass bushings pressed into drill holes in the base. In this instance, the base is constructed of bakelite. If a metallic base should be employed, it is necessary that these bushings be insulated therefrom. The electrical connections from these terminals to various contact members and the electromagnets, are made on the back of the base. Flexible conductors 46 and 47 are provided for making electrical connection to the coil 5 of the electromagnet. One end of the electromagnet coil 5 is grounded to the core. The flexible conductor 47 is provided for furnishing a better electrical connection between the bracket 2 and the core.

The relay is preferably mounted in a control box or panel upon three insulated studs that are adapted to coincide with the mounting terminals 43, 44 and 45. These studs are insulated from the control board and furnish the terminals of the electrical connections to the relay. By this construction, the electrical connections of the relay may be wired upon the panel board. In this manner the relay may be very easily mounted or dismounted. Also, this construction provides a very satisfactory manufacturing method, not only that the panel board may be wired separately, but that, in the event that a protective relay is not desired for the particular job, the terminals of the panel board may be connected together. After this, if it becomes necessary to install a protective relay, it may be accomplished very readily by removing the connections between the studs and mounting the relay.

Having described the mechanical construction of our improved protective relay, we will now explain its operation when it is connected in a wind driven battery charging system.

Referring to Fig. 4, the circuit controlling mechanism is mounted within a suitable cabinet 49. The relay 50 is our improved protective relay, the mechanical construction of which has just been described. Relay 51 is the reverse current cut-out relay. This relay, together with its circuit and operation, is described in the co-pending application of Harlie O. Putt, Serial No. 66,928, filed November 5, 1925, issued as Patent No. 1,701,634 February 12, 1929. A main switch 52, for controlling the connection of the generator to the control mechanism together with the associated fuses 52$^a$ and 52$^b$, is shown in the lower left hand corner of the cabinet. The other fuse blocks are disposed adjacent to the switch in the bottom of the cabinet. An ammeter 53 and a voltmeter 54 are of the usual construction. A wind driven generator 55 is diagrammatically shown, together with its slip rings 56, 57 and 58. The field of this generator is shown at 59. The construction and general operation of the wind driven battery charging system, together with the operation of the reverse current cut-out relay, is disclosed in the co-pending application of Herbert E. Bucklen, Serial No. 78,274, filed December 30, 1925. Since the operation of the battery charging system has been described in the co-pending application of Bucklen, it will only be necessary to briefly mention it, in order to point out the operation of my improved protective relay.

If the protective relay 50 is installed on a 32-volt battery charging system, it is adjusted to close its contacts 65 which are a diagrammatic showing of the contact making members 26 and 27 and the contact members 28 and 29, when the voltage of the generator 55 reaches 25 or 30 volts. The reverse current cut-out relay 51 in this instance is adjusted to close a charging circuit through it when the voltage of the generator is between 40 and 45 volts. The protector relay 50 will be adjusted to open its contacts on falling generator voltage when the electromotive force is about 15 volts. The reverse current cut-out relay is adjusted to open its contacts in the charging circuit when the voltage of generator falls below 38 volts. By virtue of these margins of operation, as well as by reason of mechanical construction, the reverse current cut-out relay 51 is very much more sensitive than the protective relay 50.

When the voltage of the generator 55 reaches 25 or 30 volts, the protective relay 50, which is connected in series with the shunt field winding 59 of the generator 55, is energized over a circuit which extends from the negative terminal of the generator 55, shunt field winding 59, slip ring 56 and its associated brush, to the right hand blade of the main switch 52 and its associated fuse 52$^a$, protective relay winding the other blade of the main switch 52, fuse 52$^b$, brush and collector ring 58 to the positive pole of the generator 55. The relay 50, upon operating, serves to connect the positive terminal of the battery 60 to the positive terminal at the generator 55. Until the protective relay 50 is operated, the positive terminal of the generator is disconnected from the positive terminal of the battery. Consequently, it will be seen that, regardless of whether the contacts of the reverse current cut-out relay 51 are closed or not, until the protective relay 50 is operated there can be no possibility of current from the battery discharging through the generator and the windings of the reverse current cut-out relay 51. When the electromotive force of the generator 55 reaches 40 to 45 volts, the reverse current cut-out relay 51 is operated to close the charging circuit. This circuit may be traced from the negative terminal of the generator 55, slip ring 57 and its associated parts, terminal 61 of relay 51, through series winding 64, through the contacts of the relay 51 to terminal 62, ammeter 53 to the negative side of the battery 60. Since the positive terminal of the generator 55 is connected to the positive pole of the battery, the battery will be charged over this circuit.

Now, with the generator 55 charging at a relatively high rate, if the fuse connected in series with the shunt field 59 should blow, it will be seen that the circuit of the relay 50 is opened, and this relay is deenergized to disconnect the positive battery conductor from the positive terminal of the generator. Therefore, there is no possibility of the battery discharging through the contact and winding of the reverse current cut-out relay 51. This possibility arises from the fact that the reverse current cut-out relay 51 would be relatively slow in its operation and permit a circuit to be completed through the generator winding were it not for the provision of the relay 50. Should the brush associated with the shunt field slip ring 56 not make proper contact, there is the same possibility of trouble as before, but the relay 50 is deenergized under these conditions with the same result as discussed. In ordinary practice the generator 55 is usually mounted close to the impeller and the battery is mounted at some place on the ground. Therefore, the generator connection has to be carried to the control panel and to the battery. Now, if the conductor connecting the slip ring 56 to the control board should blow down during a storm, the relay 50 will again be deenergized to disconnect the positive terminal of the battery from the positive pole of the generator. It will be seen that the main switch 552 opens at the shunt field circuit of the generator 55. This is done so that if the main generator circuit extending to the slip ring 58 and its associated brush should be opened, either by throwing the switch 52 or by a breaking of the conductor leading from the brush associated with the slip ring 58 to the switch, or at some other point, the circuit of the shunt field 59 is opened. This is to deenergize the generator field, and if it were not done the generator voltage would build up to dangerous proportions through the shunt field and burn out the field winding. In addition, when the battery load is removed by opening the main switch 52 or by a break occurring in the main circuit, there is no speed control for the generator and the impeller or propeller would race at a speed much greater than when under load with the same wind velocity, and an excessive voltage would be generated and impressed upon the field winding. Since the field winding 59 is deenergized whenever the main switch is opened, no trouble of this nature can occur.

It will be observed that if any break occurs in the shunt field circuit, the relay 50 is deenergized to open the connection between the positive terminal of the generator and the positive pole of the battery. The collapse of the magnetic field generated by the relay 50 takes place in approximately the same time as the collapse of the field of the generator 55, and the contacts 65 of the protective relay 50 are opened at the time when there is zero current value flowing through them. This provision insures that there is very little arcing at the contacts 65 of the protective relay. The openings of the contacts 65 occur at this zero current value and an instant preceding a reverse current discharge through the generator.

By the connection of the protective relay 50 in the circuit as described, it is possible to employ a fuse in the shunt field circuit that is just above the capacity of the field 59. Were it not for this protective relay, it would be necessary to place a fuse of much higher current carrying capacity in this shunt field circuit in order to prevent the fuse blowing when the battery is being charged at a relatively high rate. This would permit a reverse discharge from the battery through the generator as previously set forth. By the provision of the protective relay 50 and a lower current carrying capacity fuse in the shunt field circuit, if the main generating circuit charging wires are opened at any point, or if a connection on the battery should be opened or the main circuit opened in the control box when the generator is charging at a comparatively high rate, the elimination of the load on the generator would permit it to speed up and raise the voltage of the shunt field and force sufficient current through it to rupture the fuse in the circuit. The rupturing of this fuse opens the circuit of the protective relay 50 so that no reverse discharge may occur and also opens the circuit of the field winding 59 so as to prevent it from being burned out. It is obvious, that with a low capacity fuse in the shunt field circuit, it is necessary to provide the protective relay 50 in order to open up the connection between the positive terminal of the generator 55 and the positive terminal of the battery 60, in order to prevent the reverse current discharge that has been hereinbefore described.

While we have described one particular embodiment of our invention, together with its incorporation into a charging system, it will be understood that we do not wish to limit our invention to this particular embodiment and application, except as set forth in the appended claims.

We claim:—

1. In a relay, an electromagnet having a core pivotally mounted upon a bracket, a pole piece attached to each end of said core, and an armature bar mounted upon said bracket in cooperative relation to said pole pieces.

2. In a relay, a bracket, an electromagnet having a core pivotally mounted upon said bracket, a pole piece attached to each end of said core, an armature bar mounted upon said bracket in cooperative relation to said pole pieces, and a contact making member attached to said pole pieces.

3. In a relay, a bracket, an electromagnet having a core pivotally mounted upon said bracket, a pole piece attached to each end of said core, an armature bar mounted upon said bracket in cooperative relation to said pole pieces, a T-shaped member mounted upon said pole pieces, and a pair of contact making members carried by said T-shaped member.

4. In a relay, a base, a bracket mounted upon said base, an electromagnet pivotally mounted upon said bracket, a pole piece attached to each end of said electromagnet, an armature bar mounted on said bracket in cooperative relation to said pole pieces, a contact making member adapted to be operated by movement of said pole pieces, and a cooperating contact member adapted to be engaged by said contact making member.

5. In a relay, a base, a bracket attached to said base, an electromagnet having its core pivotally mounted upon said bracket, a pole piece attached to each end of said core, an armature bar supported on said bracket in cooperative relation to said pole pieces, a T-shaped bar rigidly attached to said pole pieces, a contact making member attached to said bar, a cooperating contact member carried by said base adapted to be engaged by said contact making member.

6. In a relay, a base, a bracket attached to said base, an electromagnet having its core pivotally mounted upon said bracket, a pole piece attached to each end of said core, an armature bar mounted on said bracket in cooperative relation to said pole pieces, a contact carrying bar attached to said pole pieces, a U-shaped member mounted upon said bracket with its upper end disposed above said contact carrying bar and its lower end disposed below said bar, and a spring carried by said U-shaped member for maintaining said contact carrying bar in an inoperative position.

7. In a relay, a base, a bracket attached to said base, an electromagnet having its core pivotally mounted upon said bracket, a pole piece attached to each end of said core, an armature bar mounted on said bracket in cooperative relation to said pole pieces, a contact carrying bar attached to said pole pieces, a U-shaped member mounted upon said bracket with its upper end disposed above said contact carrying bar and its lower end disposed below said bar, and adjusting means carried by said U-shaped member for adjusting the relative position of said contact carrying bar and the relative power that will have to be generated by the electromagnet to operate it.

8. In a relay, a base, a bracket attached to said base, an electromagnet having its core pivotally mounted upon said bracket, a pole piece attached to each end of said core, an armature bar mounted on said bracket in cooperative relation to said pole pieces, and extending slightly beyond the sides of said pole pieces, and a member of magnetic material attached to either end of said armature bar and extending upward toward said pole pieces.

9. In a relay, a base, a bracket mounted upon said base, an electromagnet having a core pivotally mounted upon said bracket, a pole piece attached to each end of said core, an armature bar mounted upon said bracket in cooperative relation to said pole pieces, and a member carried by said armature bar operative to decrease the reluctance of the magnetic circuit between said pole pieces and said armature bar.

In witness whereof, we hereunto subscribe our names this 7th day of June, 1927.

HERBERT E. BUCKLEN.
HARLIE O. PUTT.